United States Patent [19]

Lewis

[11] 4,270,243
[45] Jun. 2, 1981

[54] POULTRY BREAST SPLITTING APPARATUS

[76] Inventor: Eugene J. Lewis, Rte. #1, Box 306, Demorest, Ga. 30535

[21] Appl. No.: 98,468

[22] Filed: Nov. 29, 1979

[51] Int. Cl.³ .......................................... A22C 21/00
[52] U.S. Cl. ...................................................... 17/11
[58] Field of Search ............... 17/11, 23; 83/418, 419, 83/420, 421, 431, 435.2

[56] References Cited

U.S. PATENT DOCUMENTS

| 3,284,846 | 11/1966 | Reeves | 17/11 |
| 3,662,430 | 5/1972 | Lloyd | 17/11 |
| 3,731,344 | 5/1973 | Phares et al. | 17/11 |
| 3,950,820 | 4/1976 | Duncan et al. | 17/11 |

*Primary Examiner*—Willie G. Abercrombie
*Attorney, Agent, or Firm*—Beveridge, DeGrandi, Kline & Lunsford

[57] ABSTRACT

Apparatus for splitting in half the breast of a poultry carcass comprising an elongated feed bar on which the carcass can be impaled to have the bar extending through the chicken immediately below the backbone and above the soft breastbone. A cutting blade is supported and rotated in a plane containing the feed bar with the axis of rotation perpendicular to and offset from the feed bar. A toothed conveyor extending along the lengthwise direction of the feed bar is mounted in close adjacency to the feed bar on the side opposite the cutting blade in a position to contact the back of an impaled poultry carcass and propel the carcass along the length of the feed car. An elongated breast support is pivotally supported in alignment with the feed bar for movement in the plane containing the feed bar and cutting blade about a pivotal axis offset from the feed bar on the same side as the cutting blade axis. The breast support pivots between a feeding position, in which the breast support is maintained substantially parallel to and in a spaced relationship to the feed bar to be in contact with the exterior surface of the breast of an impaled carcass as the carcass is moved by the conveyor along the feed bar, and a retracted position, in which the breast support is tilted at an angle downwardly with respect to the feed bar sufficiently to increase the spacing between the feed bar entrance end and the breast support to permit a carcass to be impaled on the feed bar.

8 Claims, 7 Drawing Figures

POULTRY BREAST SPLITTING APPARATUS

BACKGROUND

The present invention relates in general to apparatus used in connection with the commercial processing of poultry and a device utilized in the dismembering of poultry carcasses for separating them into component parts which then may be packaged separately for the market. In particular the present invention relates to a device by which the breast of a poultry carcass, such as a chicken, can be split into two parts by severing it along a line extending between the soft breastbone and the backbone.

Although complicated apparatus has been utilized for removing the various parts from a poultry carcass, including pulling the breast meat from the back and rib cage of the carcass, such as U.S. Pat. No. 3,943,600, the most common practice of splitting in half the breast portion of a poultry carcass has been for an operator to hold the carcass by hand and push it by hand across the top of a rotating circular cutter blade. This obviously subjects the operator to the extreme hazard of exposing his hands to an unprotected cutter blade.

SUMMARY

The present invention involves providing a cutting device on which the operator can impale a poultry carcass and then the various component items of structure of the device automatically carry the carcass across a rotating cutter blade which severs the carcass along a line extending between the soft breastbone and the poultry back. A preferred embodiment of the invention comprises an elongated feed bar with a pointed front end mounted to extend lengthwise on a supporting frame. A rotating cutter blade is supported on the frame for rotation in a plane containing the feed bar with the axis of rotation of the cutter blade vertically below the feed bar between its ends with a top segment of the cutting blade extending into a slot in the lower side of the feed bar. An endless tooth conveyor is mounted on the frame with a lower run spaced closely adjacent and above the upper surface of the feed bar to extend in the lengthwise direction of the bar from a point a little rearwardly of the pointed front end portion of the bar such that the toothed lower run of the conveyor contacts the back of a poultry carcass inpaled on the feed bar and propels the carcass along the length of the bar through the rotating cutter blade. An elongated breast support is pivotally supported by the frame in alignment with and below the feed bar for pivotal motion in the plane containing the feed bar and the cutter blade. The breast support pivotally moves between a feeding position in which the breast support is substantially parallel to the feed bar and slightly below it in sliding contact with the outer breast of the carcass immediately adjacent the breastbone as the impaled carcass is moved by the conveyor along the feed bar and a retracted position in which the breast support is tilted downwardly and forwardly relative to the feed bar to increase the spacing between the pointed entrance end of the feed bar and the breast support sufficiently for a carcass to be impaled on the feed bar for being contacted by the toothed conveyor and carried along the feed bar through the rotating cutter blade with the breast support in the feeding position. In the described embodiment a counterweight is affixed to the breast support structure in a manner to bias the breast support to the retracted position whenever a carcass has been propelled by the conveyor through the cutting blade and beyond the far end of the breast support so as to pivot the breast support forwardly to the retracted position for impalement of another carcass onto the feed bar.

An object of this invention is to provide an apparatus for splitting the breast of a poultry carcass in half.

A further object of the invention is to provide an apparatus for splitting in half a poultry carcass which protects the operator from the rotating cutter blade of the apparatus.

DRAWINGS

A preferred embodiment of the invention can best be understood by reference to the following description taken in connection with the accompanying drawings in which.

DESCRIPTION OF A PREFERRED EMBODIMENT

Figure 1:
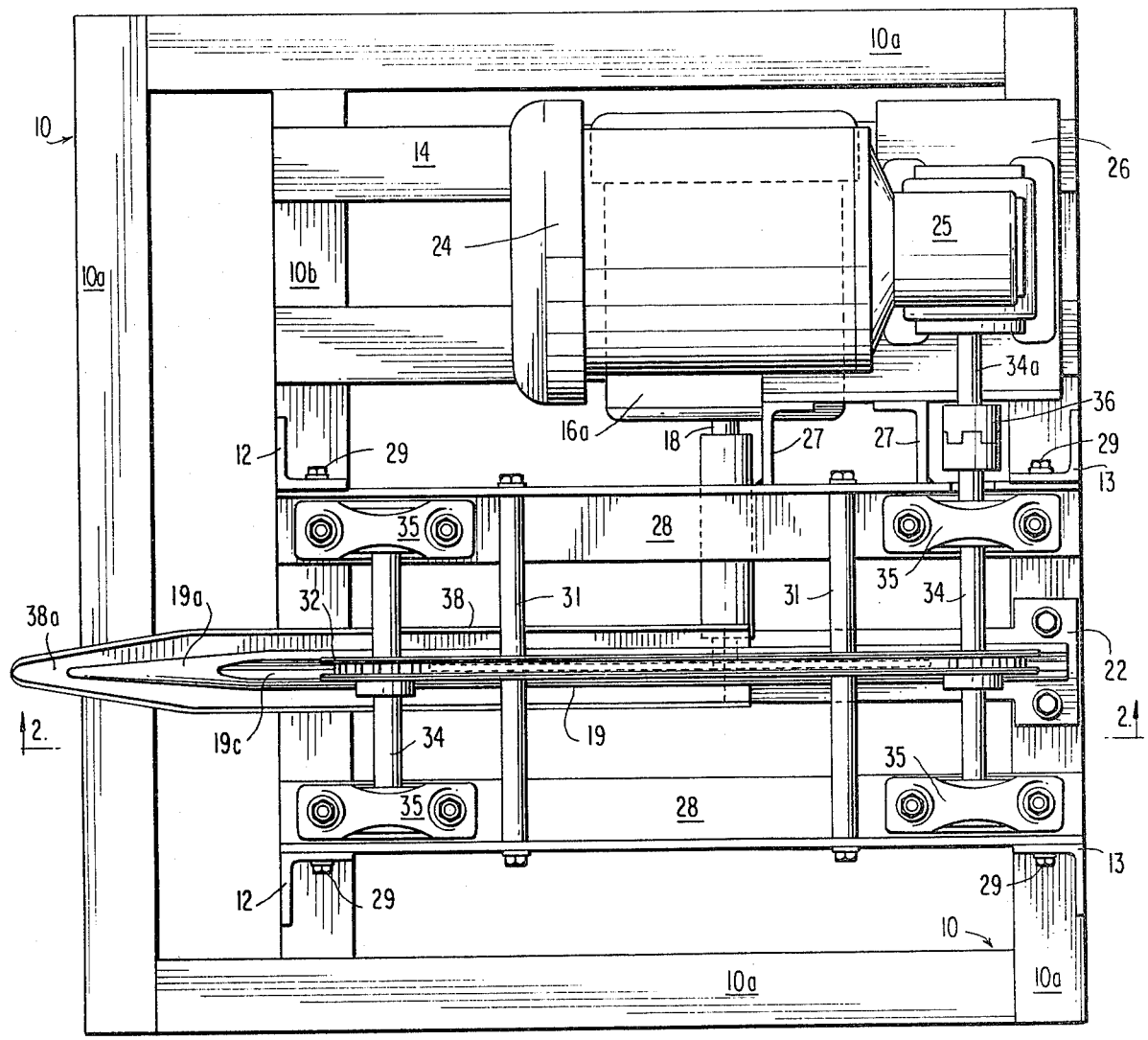
FIG. 1 is a plan view of the apparatus as seen from above.

The device may be conveniently supported on a substantially square, horizontally extending, open frame base 10 comprising four angles 10a that are welded together in the form of a square, this frame having a transversely extending interior frame member 10b adjacent its front end and downwardly extending legs 11 are welded to the corners of the base frame 10 for supporting the frame on a floor. A pair of vertically extending, front structural support stanchions 12 are welded at their lower ends to the interior frame member 10b and a similar pair of vertically extending, rear support stanchions 13 are welded at their lower ends to the frame member 10a extending transversely across the rear of the frame 10, these stanchions conveniently being angle members. A pair of motor support frame members 14 are welded to and extend lengthwise of the frame near one side between the inner transversely extending frame angle 10b and the interior frame member 10a and a central frame member 15 extends lengthwise of the frame 10 between the transversely extending interior frame member 10b and the rear frame angle 10a.

A cutting blade motor 16a supported on motor support frame members 14 drives a vertically extending, circular cutter blade 17 through a drive shaft 18 for rotation in a vertical plane extending lengthwise in the central portion of the frame base 10. An elongated feed bar 19 with a pointed front end portion 19a extends lengthwise of the frame base 10 ahead of and rearwardly of the cutter blade 16 in the plane of the rotatable cutter blade and is supported above the cutter blade rotational axis 18 by a rear vertically extending support shaft 20 and spaced forwardly thereof a split, vertically extending support bar 21. The support shaft 20 and the split support bar 21 are supported on the central frame member 15 by a plate 22 by nuts and bolts 23, one half of the split support bar 21 being on each side of the cutting blade 16. The underside of the feed bar 19 directly over the cutter blade 16 has a lengthwise extending slot 19b into which an upper segment of the cutter blade 16 extends. A V-shaped groove 19c extends lengthwise along the top side of the feed bar 19 from the pointed front portion 19a to the rear of the bar, the shape of the groove being configured such that the backbone of a poultry carcass impaled on the feed bar will ride along in the groove 19c in the manner illustrated in FIG. 7 as the poultry carcass is carried along the feed bar by a conveyor 23 to be subsequently described.

A conveyor motor 24 and gear box 25 are supported on a platform 26 by angles 27 that are welded to one of a pair of conveyor side frame supports 28 that extend lengthwise of the frame base 10 above and on each side of the feed bar 19. The conveyor side frame supports 28 are supported at their respective ends by the front and rear vertical support stanchions 12, 13 by bolts 29 in vertically extending slots 30 in the top portions of the support stanchions, stiffening rods 31 being bolted to and extending between mid sections of the pair of conveyor side frame supports 28. A conveyor endless chain having closely spaced pairs of connected lengths 32 with outwardly extending teeth is supported at each end by a pair of spur wheels 33 each having support shafts 34 of which each is supported at its outer end portions in a bearing 35, each of which is supported on the conveyor side frame supports 28. One of the conveyor spur wheel support shafts has an extension 34a extending through its support bearing 35 and is connected through a universal joint 36 to the conveyor motor gear box 25. The portions of the conveyor teeth 32 between the supporting spur wheels 33 ride on each side of a vertically aligned conveyor support plate 37 with the lower run 23a of the conveyor spaced a short distance above and parallel to the upper surface of the feed bar 19. The conveyor motor drives the conveyor to cause the teeth of the lower run 23a to move in the direction from adjacent the front pointed end 19a of the feed bar rearwardly toward the cutter blade 16.

Figure 4:
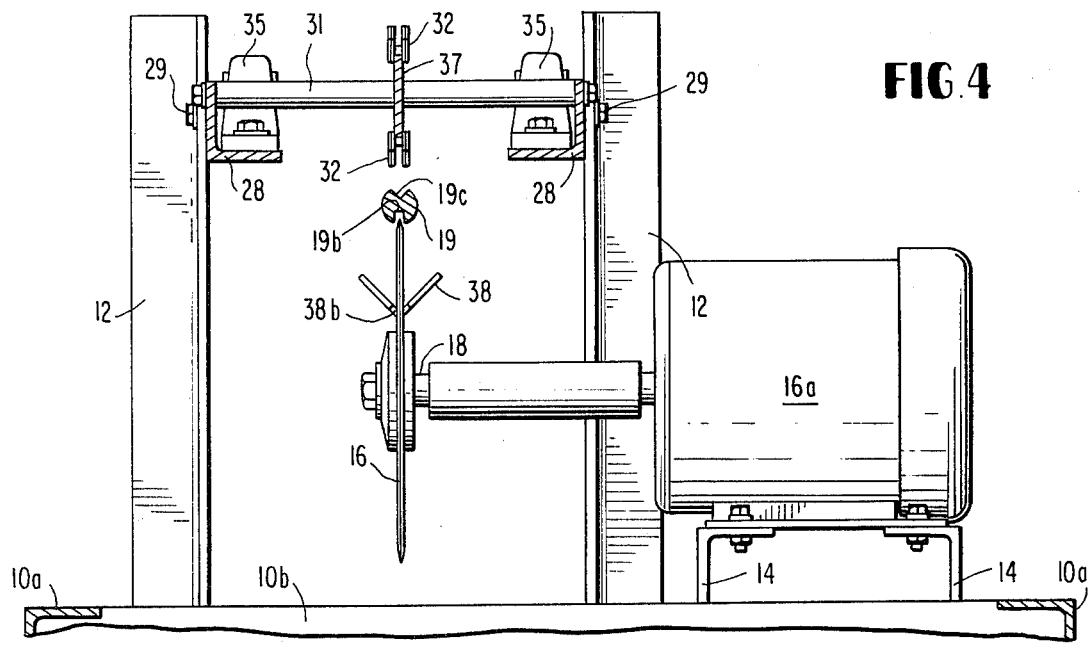
FIG. 4 is a sectional side elevation along section line 4—4 of FIG. 2, structural portions in the background having been omitted for clarity.
Figure 5:
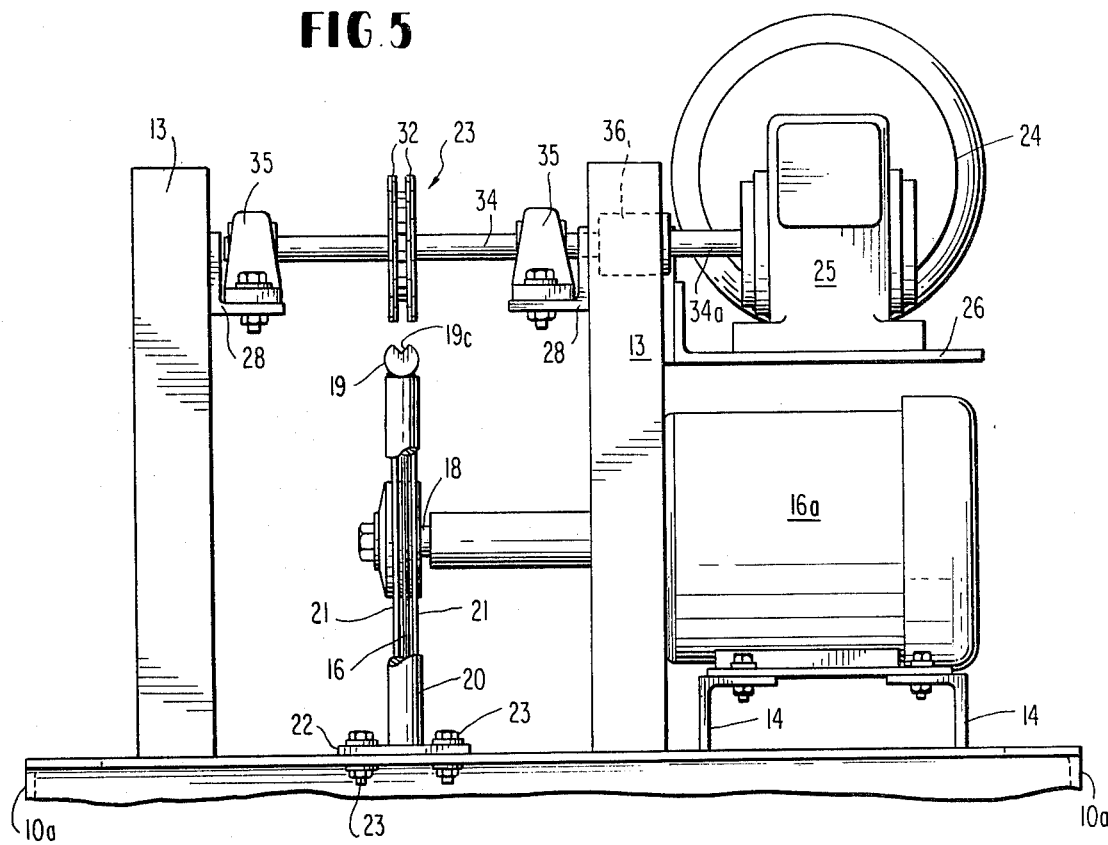
FIG. 5 is a rear end elevation with portions of the structure omitted for clarity.
Figure 6:
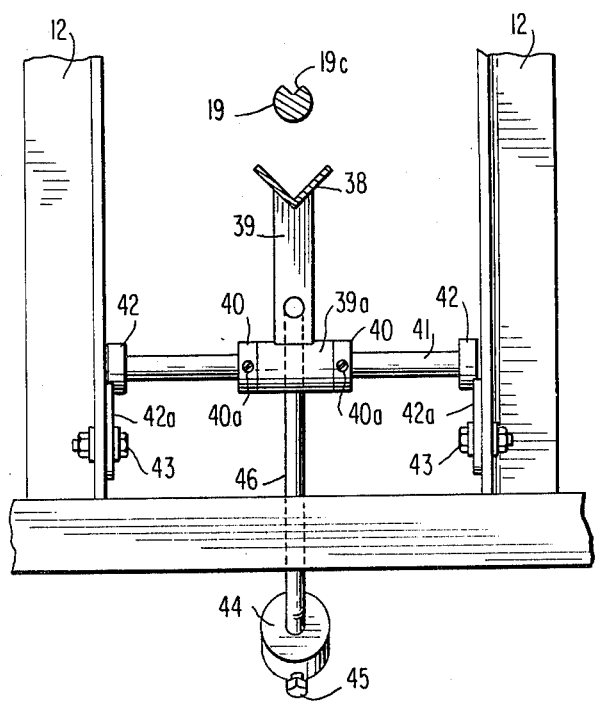
FIG. 6 is a sectional elevation along section line 6—6 of FIG. 2.

An elongated, trough shaped breast guide 38 is supported for pivotal motion beneath the feed bar 19 in the plane of the feed bar and the cutter blade 16 by the arm 39 having its upper end affixed to the underside of the breast guide 38 and the lower collared end 39a rotatably supported on the shaft 41 between a pair of collars 40 clamped to the support shaft 41 by set screws 40a. Both ends of the support shaft 41 are supported in recesses in support fittings 42 of which the lower portions 42a are supported for vertical adjustment on the front support stanchions 12 by adjusting bolts 43 extending through the vertically extending slot 42b in the lower portion of each shaft support. A biasing counterweight 44 is adjustably supported by means of the set screw 45 at the outer end of the curved counterweight support arm 46 that extends forwardly from the breast guide support arm 39. The breast guide cross section is a V-shaped trough, as illustrated in FIGS. 4 and 6, with a tapered front portion 38a and the rear portion of the guide overlying the cutter blade 16 containing a central slot 38b to clear the cutter blade 16.

For purposes of description the structure is illustrated and described without side covers being attached. In actual practice sheet metal cover plates are attached to the sides and top of the frame so as to enclose the conveyor and motors, the cutting blade and other component parts of the device with an opening in the front of the cover through which the tapered forward ends of the feed bar and breast guide extend to permit the operator to impale carcasses on the feed bar for feeding them into the machine and an opening directly rearwardly of the rear end of the feed bar 19 through which the split carcasses fall or are removed from the after end of the feed bar.

Figure 2:
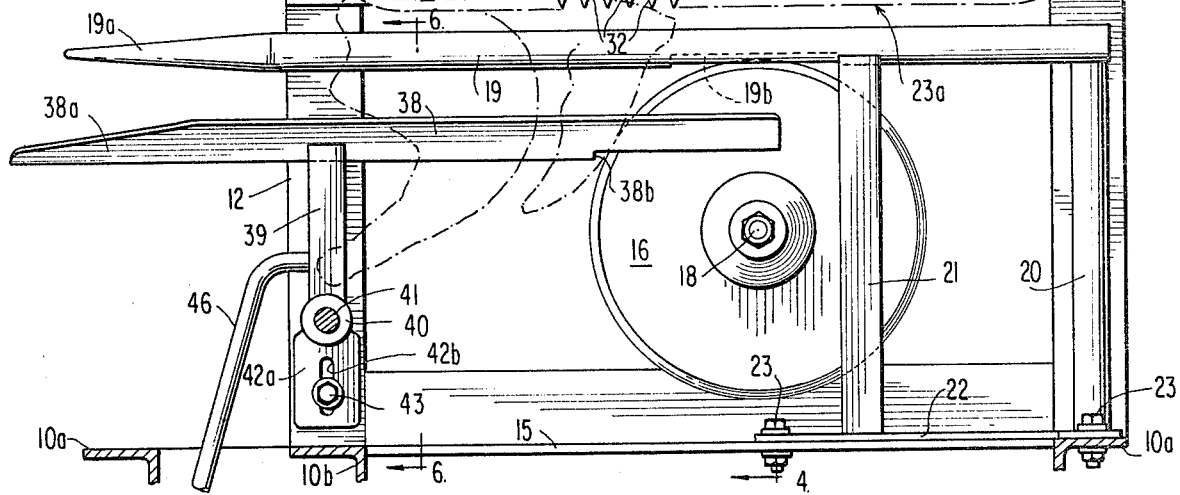
FIG. 2 is a sectional side elevation along section line 2—2 of FIG. 1 with the breast support guide in the feeding position, structural portions in the background having been omitted for clarity.
Figure 3:
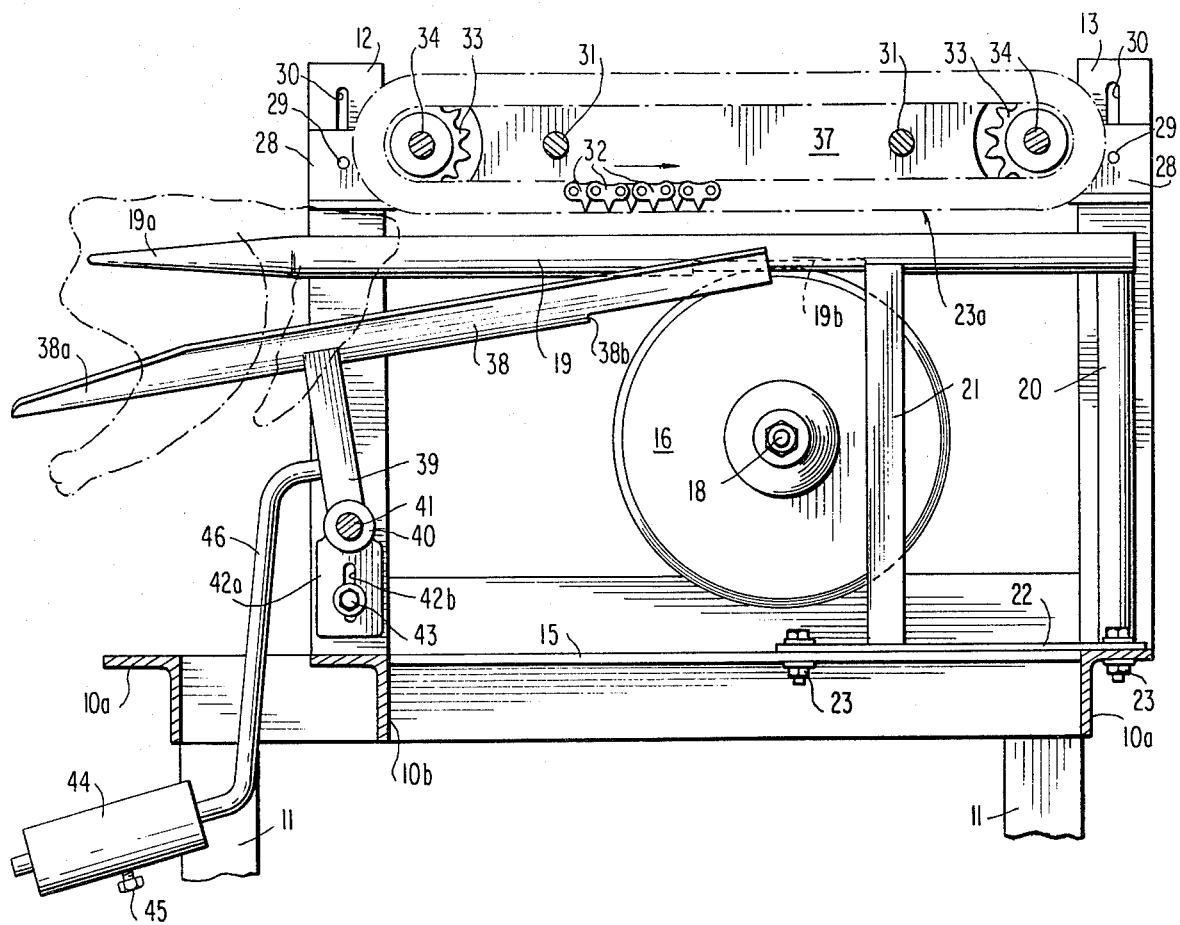
FIG. 3 is the same view as FIG. 2 but with the breast support guide in the retracted position.

FIG. 3 illustrates the equipment at the beginning of a cutting cycle, the breast guide being pivoted to the retracted position by the counterweight 44 to tilt the breast guide forwardly at an angle to the feed bar 19 with the rear end of the breast guide 38 resting on the feed bar so that a sufficient space exists between the tapered front end portions 19a and 38a of the feed bar and breast guide to permit a poultry carcass, illustrated in dashed lines, to be impaled on the feed bar with the feed bar extending through the carcass and out its tail end with the backbone of the carcass resting in the groove 19c of the feed bar. As the carcass is pushed forwardly by the operator onto the forward section of the feed bar 19 the back surface of the carcass above the backbone is contacted by the toothed projections 32 of the conveyor 33 which move the carcass rearwardly along the length of the feed bar toward the cutter blade 16. As the carcass is carried along the feed bar the lower breast portion comes in contact with the V-shaped trough of the forwardly tilted breast guide 38 which is then tilted rearwardly to its feeding position substantially parallel to the feed bar, as illustrated in FIG. 2, through the pressure and weight exerted on the breast guide 38 by the poultry carcass as it is moved along the length of the feed bar and breast guide in counteracting the biasing effect of the counterweight 44. The breast guide 38 is retained in the feeding position substantially parallel to the feed bar 19 by contact of the counterweight arm 46 with the lower edge of the front frame base angle 10a, which acts as a stop. The conveyor 23, of which the toothed portions 32 of the lower run 23 are in gripping contact with the back surface of the carcass, continue to move the impaled carcass in a sliding motion along the length of the feed bar 19 with the backbone of the carcass in contact with and sliding along the feed bar groove 19c and the carcass outer breast section immediately adjacent the soft breastbone in sliding contact with the breast guide 38, in the manner illustrated in FIG. 7, to carry the impaled carcass through the rotating cutter blade 16 which splits the carcass breast along a line extending from the breast soft bone to the backbone. The split carcass is then carried off the rear end of the feed bar 19 by the conveyor 23 and discharged from the apparatus. As the carcass moves rearwardly off the rear end of the breast guide 38 in the vicinity of the cutting blade 16, the biasing action of the counterweight 44 causes the breast guide 38 again to tilt forwardly to the retracted position illustrated in FIG. 3 with the rear end of the breast guide in contact with the lower surface of the feed bar 19, at which time the operator can impale another carcass on the feed bar 19 and cause the impaled carcass to be fed by the conveyor 23 through the cutting blade 16.

Figure 7:
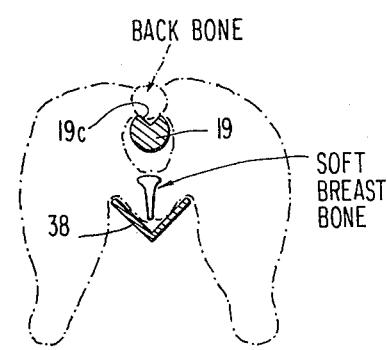
FIG. 7 is a representation of a poultry carcass impaled on the feed bar with the breast resting on the breast guide and generally illustrating the relative positions of the backbone and the soft breastbone of the poultry carcass.

Through the vertical adjustments previously described of the breast guide 38 and the conveyor support frame 28, these two structures can be adjusted vertically to accommodate different size poultry carcasses to ensure that the conveyor teeth 32 of the lower run 23a are in gripping contact with the back surface of the carcass to carry it along the length of the feed bar 19 and the breast guide 38 is in sliding contact with the outer breast of the carcass when the breast guide is tilted to the feed position in the manner illustrated in FIG. 7.

Although the feed bar 19, the conveyor 23 the cutter 16 and the breast guide 38 are described as being supported by the support frame which has legs for supporting the apparatus on the floor, these structural items could be supported in their described relationship by any other type of appropriate frame structure. Likewise, although the motion of the breast guide 38 is indicated to be a tilting motion, the breast guide could be supported in a manner so that its motion could be a linear motion substantially parallel to and away from and toward the feed bar. Other means of biasing the feed bar could be utilized to cause it to return to the retracted position other than a counterweight. Further, although the feed bar, cutter blade and breast support are described as being vertically below the conveyor, this relationship could obviously be reversed or in some other relationship with respect to the vertical. It should be understood that the foregoing disclosure relates only to a preferred embodiment of the invention and that numerous modifications or alterations may be made therein without departing from the spirit and the scope of the invention as set forth in the appended claims.

I claim:

1. A device for splitting the breast of a poultry carcass comprising a support frame, an elongated feed bar affixed to said frame and adapted to support a poultry carcass impaled thereon between the carcass back and breast bones, a cutting blade mounted on said frame for rotation in a plane containing said feed bar and about a rotational axis perpendicular to and offset laterally of said feed bar between its ends, means for rotating said cutting blade about its axis, conveying means extending in the lengthwise direction of said feed bar in closely spaced, parallel adjacency thereto and adapted to contact the exterior of the back of a poultry carcass impaled on said feed bar for propelling the impaled carcass lengthwise of said feed bar from an entrance end of said bar through said cutting blade, and an elongated carcass breast guide movably supported on said frame in alignment with and spaced from said feed bar on the side opposite said conveying means in the plane containing said feed bar and cutter blade for movement relative to said feed bar in said contained plane between a feed position in which said breast guide is maintained in pressing contact with the exterior breast portion of an impaled carcass being carried by said conveying means along said feed bar into contact with said cutting blade and a retracted position in which the space between said breast guide and said feed bar entrance end is increased sufficiently to permit a carcass to be inserted between said feed bar and breast guide for impalement on said feed bar.

2. The device of claim 1 wherein said breast guide includes biasing means adapted to maintain said breast guide in said retracted position when an impaled carcass passes beyond the end of said breast guide.

3. The device of claim 2 wherein said breast guide comprises an elongated guide trough pivotally mounted on said frame for pivotal motion about an axis offset laterally of said guide trough between its ends on the side opposite said feed bar.

4. The device of claim 3 wherein said biasing means comprises a counterweight affixed to said guide trough in an offset, spaced relationship to said pivotal axis.

5. The device of claim 1 wherein said feed bar contains a cut-out section into which an outer segment of said cutting blade extends.

6. The device of claim 5 wherein the exit end portion of said guide trough opposite the end portion adjacent said feed bar entrance end portion is split with a portion lying on both sides of said cutting blade.

7. The device of claim 5 or 6 wherein said conveying means comprises an endless tooth conveyor supported on said frame, said conveyor having a run with outwardly projecting teeth spaced therealong extending in a spaced and parallel relationship to said feed bar, and means powering said conveyor for movement of said teeth along said feed bar.

8. The device of claim 1 or 6 wherein said feed bar vertically underlies said conveyor and said breast guide and cutting blade rotational axis vertically underlie said feed bar.

* * * * *